(12) United States Patent
Chen et al.

(10) Patent No.: US 8,135,713 B2
(45) Date of Patent: Mar. 13, 2012

(54) SOURCING CONTROLLER

(75) Inventors: Simon Chen, Shanghai (CN); Fred Chen, Shanghai (CN); Anna Zhang, Shanghai (CN); Tian Xu, Shanghai (CN); Jay Xiong, Shanghai (CN)

(73) Assignee: SAP AG, Walldorf (DE)

( * ) Notice: Subject to any disclaimer, the term of this patent is extended or adjusted under 35 U.S.C. 154(b) by 1350 days.

(21) Appl. No.: 11/394,470

(22) Filed: Mar. 31, 2006

(65) Prior Publication Data

US 2007/0250330 A1     Oct. 25, 2007

(51) Int. Cl.
*G06F 7/00* (2006.01)

(52) U.S. Cl. ........................................................ 707/736
(58) Field of Classification Search ................ 707/731, 707/736
See application file for complete search history.

(56) References Cited

U.S. PATENT DOCUMENTS

| | | | |
|---|---|---|---|
| 7,136,860 B2 * | 11/2006 | Doliov | 707/707 |
| 7,167,844 B1 * | 1/2007 | Leong et al. | 705/80 |
| 7,243,334 B1 * | 7/2007 | Berger et al. | 717/109 |
| 7,447,691 B2 * | 11/2008 | Doliov | 707/707 |
| 7,610,233 B1 * | 10/2009 | Leong et al. | 705/37 |
| 7,668,861 B2 * | 2/2010 | Steven | 707/999.102 |
| 2002/0002445 A1 * | 1/2002 | Doliov | 703/2 |
| 2003/0018544 A1 * | 1/2003 | Nanbu et al. | 705/27 |
| 2003/0115129 A1 * | 6/2003 | Feaver et al. | 705/37 |
| 2003/0212604 A1 * | 11/2003 | Cullen, III | 705/26 |
| 2005/0105513 A1 * | 5/2005 | Sullivan et al. | 370/352 |
| 2005/0125544 A1 * | 6/2005 | Zhao | 709/227 |
| 2005/0188010 A1 * | 8/2005 | Valk | 709/203 |
| 2005/0197852 A1 * | 9/2005 | Gebhard et al. | 705/1 |
| 2006/0004594 A1 * | 1/2006 | Doliov | 705/1 |
| 2006/0080037 A1 * | 4/2006 | Borg et al. | 702/1 |
| 2006/0259337 A1 * | 11/2006 | Bierbaum et al. | 705/7 |
| 2006/0259418 A1 * | 11/2006 | Feaver et al. | 705/37 |
| 2007/0038755 A1 * | 2/2007 | Sullivan et al. | 709/226 |
| 2007/0061211 A1 * | 3/2007 | Ramer et al. | 705/25 |
| 2007/0168933 A1 * | 7/2007 | Berger et al. | 717/106 |
| 2007/0192315 A1 * | 8/2007 | Drzaic et al. | 707/5 |
| 2007/0261026 A1 * | 11/2007 | Berger et al. | 717/109 |
| 2008/0010307 A1 * | 1/2008 | Doliov | 707/100 |
| 2008/0104596 A1 * | 5/2008 | Buonanno et al. | 718/101 |
| 2010/0023445 A1 * | 1/2010 | Feaver et al. | 705/37 |
| 2010/0125542 A1 * | 5/2010 | Doliov | 706/52 |

OTHER PUBLICATIONS

English translation of office action dated Sep. 6, 2010 issued in the corresponding Chinese Patent Application No. 200710092115.8.

* cited by examiner

*Primary Examiner* — Shahid Alam
*Assistant Examiner* — Alexandria Bromell
(74) *Attorney, Agent, or Firm* — Kenyon & Kenyon LLP

(57) ABSTRACT

An intelligent sourcing controller for sourcing potential suppliers from external sources such as the Internet as well as internal sources such as a local data server. The intelligent sourcing engine controller provides a supplier appraisal to the buyer as decision support. The intelligent sourcing controller integrates its supplier appraisal criteria with the buyer's sourcing criteria, classifying the collected information in the same way a buyer configures his requirements for the suppliers. The intelligent sourcing controller synchronizes the Internet sourcing results with the local data server after each search to renew data in the local data server in time and the sourcing criteria can be reused in future for decision support.

17 Claims, 11 Drawing Sheets

Detail Selection

China ▶ Medicine Manufacturing ▶

■ Special Requirements

1. Foreign trade license          ⊙ Must    ○ Optional
2. ISO 9000                       ⊙ Must    ⊙ Optional
3. Free sample                    ○ Must    ⊙ Optional
4. Original Producer              ⊙ Must    ○ Optional
5. GMP Certification              ⊙ Must    ○ Optional
6. GSP Certification              ○ Must    ⊙ Optional ■ Customized Requirements 1. GAP Certification              ⊙ Must    ○ Optional
2.                                ⊙ Must    ○ Optional

[Previous] [Next] [Cancel]

Fig. 2B

Normal requirements

1. Yes/Not
- Have ISO Certification
- Have post sale service
- ...

2. Comparability
- Similar product name
- Product classification
- ...

3. Range(Contiuous)
- Lowest price
- Shortest lead time
- Best quality(6 σ)...

4. Scores(Discrete)
- Better payment term
- Better inco-term
- ...

Fig. 2C

Weighting Level Selection

| Changed-lasttime | | | | |
|---|---|---|---|---|
| 1. Own P.N. | ○ Very Important | ○ Important | ○ Medium Important | ○ Less Important ● Not Important |
| 2. Manufacturing P.N. | ● Very Important | ○ Important | ○ Medium Important | ○ Less Important ○ Not Important |
| 3. Price/pc | ● Very Important | ○ Important | ○ Medium Important | ○ Less Important ○ Not Important |
| 4. L/T | ● Very Important | ○ Important | ○ Medium Important | ○ Less Important ○ Not Important |
| 5. Certificate | ● Very Important | ○ Important | ○ Medium Important | ○ Less Important ○ Not Important |

You Can Also
*Weighting More...*
*Select Used Weighting*

[Previous] [Next] [Save] [Cancel]

Fig. 2D

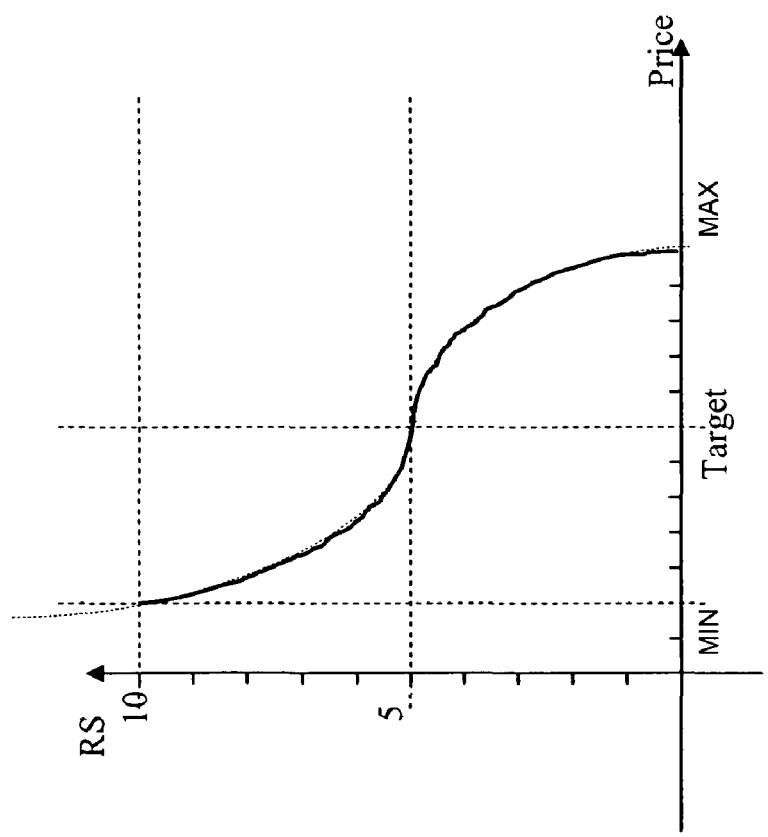

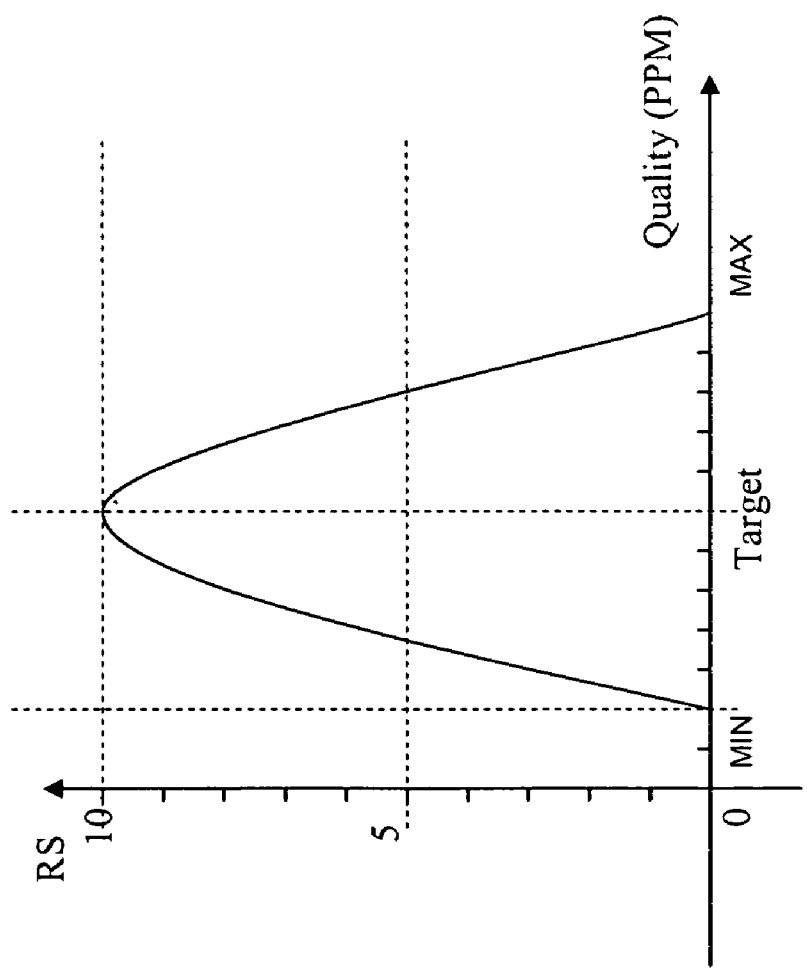

SOURCING CONTROLLER

BACKGROUND

In a supplier selection process, a buyer sends out a Request for Quotation (RFQ) to potential suppliers and the suppliers respond back with price quotations. The buyer often sends the RFQ to several potential suppliers. However, when a buyer sources, or mines for, potential suppliers, the buyer may have to review its own contacts and may try to identify new suppliers through the Internet, business-to-business (B2B) sourcing websites, or other external database(s). The buyer then contacts the potential suppliers via telephone, fax, and/or email, to get some general information about the potential suppliers before sending the RFQ to selected potential suppliers.

In such an approach, the buyer must go through a number of sources to find potential suppliers. In addition, this approach makes it difficult for the buyer to differentiate the suppliers. The buyer may get information about a number of suppliers, but the buyer has to compare manually the suppliers himself to determine which supplier fits his needs better. Further, the buyer often uses the same criteria to repeatedly search for suitable suppliers. However, the available approach does not allow automatic reuse of the sourcing criteria. The user has to repeat the process for manually collecting a list of potential suppliers, obtaining general information about potential suppliers, and comparing suppliers each time he searches for suppliers.

Thus, it is desirable to introduce a method and system for obtaining information about potential suppliers, analyzing the obtained information and providing ranking of the suppliers to help the buyer to make a decision.

BRIEF DESCRIPTION OF THE DRAWINGS

FIG. 2B illustrates an exemplary graphical user interface provided by a business configuration panel according to an embodiment of the present invention.

FIG. 2C illustrates an exemplary graphical user interface provided by a business configuration panel according to an embodiment of the present invention.

FIG. 2D illustrates an exemplary graphical user interface provided by a business configuration panel according to an embodiment of the present invention.

FIG. 3A illustrates an exemplary function curve representing suppliers' responses to a buyer's requirement for price according to an embodiment of the present invention.

FIG. 3C illustrates an exemplary function curve representing suppliers' responses to a buyer's requirement for quality according to an embodiment of the present invention.

DETAILED DESCRIPTION

Embodiments of the present invention provide a sourcing engine controller to improve the supplier selection efficiency. The sourcing engine controller may be middleware, which integrates information from various websites, a user database and real time information from suppliers, and recommends suppliers to the user accordingly. It should be understood that suppliers include both service supplier and product supplier.

Embodiments of the present invention provide for a sourcing engine controller which searches for potential supplier information from both the Internet and a local data server via pre-defined sourcing criteria. To further differentiate suppliers, and thus improving the efficiency of supplier selection, the sourcing engine controller may provide a supplier appraisal to the buyer as decision support. The sourcing engine controller integrates its supplier appraisal criteria with the buyer's sourcing criteria, classifying the collected information in the same way a buyer configures his requirements for the suppliers. The sourcing controller may synchronize the Internet sourcing results with the local data server after each search to renew data in the local data server in time and the sourcing criteria can be reused for decision support. When buyers define the criteria and click the sourcing button, the sourcing engine controller may rate potential suppliers based on both ranking from its supplier appraisal and ranking from third party websites. To avoid double counting of suppliers from different resources, the sourcing engine controller may launch a supplier identification agent to identify each supplier.

Figure 1:
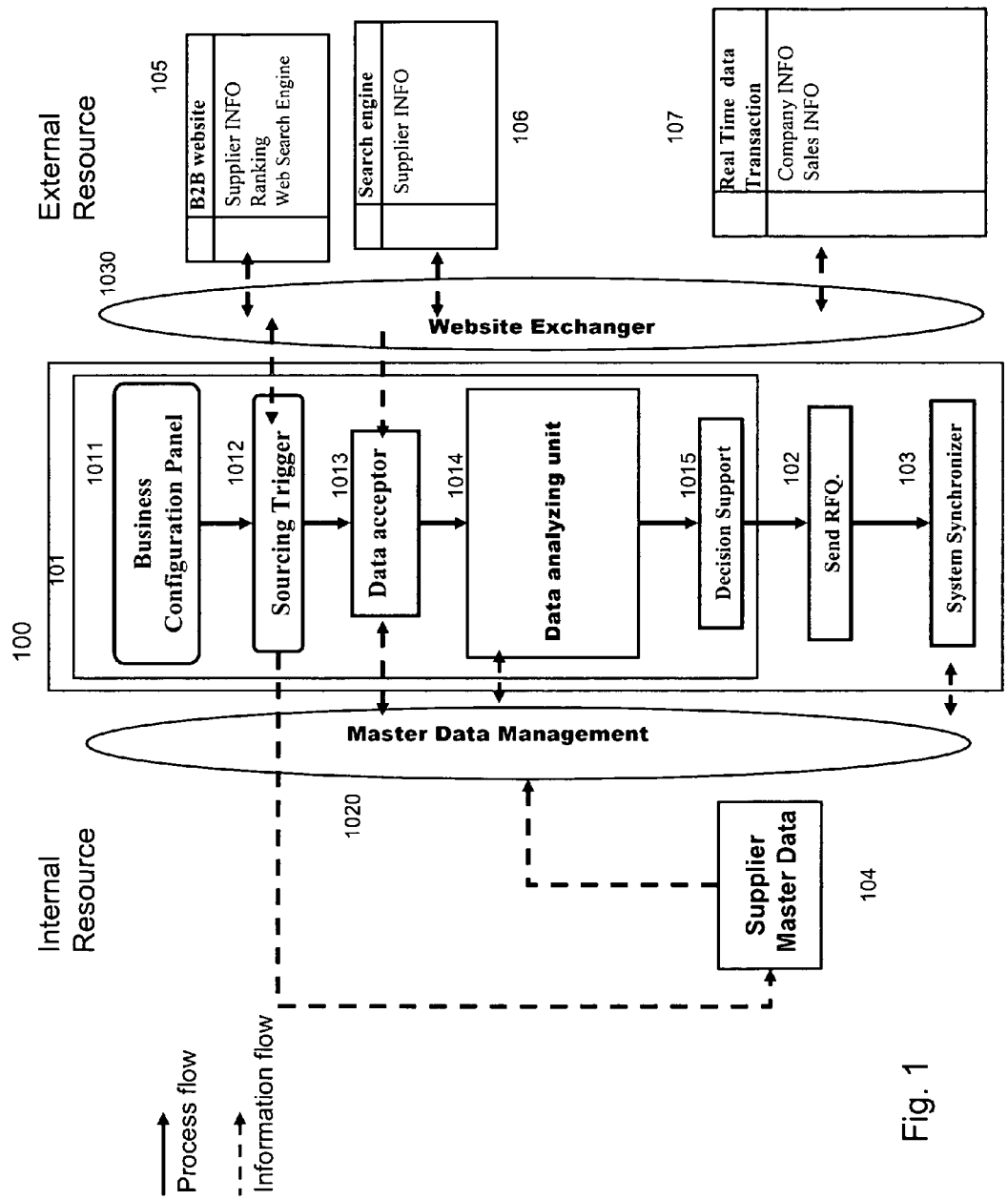
FIG. 1 illustrates a system for sourcing potential suppliers according to an embodiment of the present invention.

FIG. 1 illustrates a system for sourcing potential suppliers according to an embodiment of the present invention. Box 101 represents an intelligent sourcing switch in a sourcing engine controller 100. The intelligent sourcing switch 101 receives requirements for suppliers from a buyer, obtains supplier information from an internal supplier master database 104 and external resources 105, 106, 107, classifies the obtained supplier information in substantially the same way in which the requirements from the buyer are classified, and calculates ranking of potential suppliers to provide decision support to the buyer. The user can then send RFQs to suppliers based on the ranking of suppliers provided by the intelligent sourcing switch 101, or the intelligent sourcing switch could trigger an RFQ automatically.

In further embodiments, a business configuration panel 1011 receives the buyer's requirement criteria for suppliers. Possible requirements for suppliers may be classified and provided to the buyer via a GUI as options from which to choose.

Figure 2A:
FIG. 2A illustrates an exemplary graphical user interface (GUI) provided by a business configuration panel according to an embodiment of the present invention.

For example, a buyer is looking for a Pharmaceutical manufacturer. As shown in FIG. 2A, the business configuration panel 1011 presents a first GUI, where the buyer may indicate the country in which he is located, e.g., via manual input or selection from a menu or list. The buyer also could input the industry segments covered by his company. The business configuration panel 1011 then presents to the buyer a second GUI, in response to the buyer's input to the first GUI, for detailed requirements for a supplier.

The detailed requirements could be divided in several classes. For example, the detailed requirements may be divided in three classes: special requirements, customized requirements and normal requirements. In one embodiment, industry specific requirements could either appear as options provided by the business configuration panel as special requirements, or input by the buyer as special or customized requirements. The normal requirements are applicable to all industries.

In the present example, since the buyer is looking into the pharmaceutical manufacturing industry segment, the options provided in the second GUI are related to medicine manufacturing. For example, in FIG. 2B, in the subclass of special requirements, in addition to providing the buyer various options which can be required of the supplier (e.g., that the supplier has a foreign trade license, ISO-9000 qualified, provides free samples, is an original producer), the business configuration panel may allow the buyer to require that the supplier is Food and Drug Administration (FDA) approved, has a Good Manufacturing Practice (GMP) certification, and/or has a Good Service Practice (GSP) certification. In subclass(es) of customized requirements, the business configuration panel also may provide a buyer options to require that the supplier has a Good Agriculture Practice (GAP) certification or other certification. Various input-style options may be provided to a buyer. For example, the buyer might input requirements via a GUI having check boxes, manual keyboard input, etc. Such a manual keyboard input might be due to a particular needed option of the buyer such as, for example, that a supplier is located within a specific geographic area.

The business configuration panel of the present invention compiles typically used sourcing requirements for suppliers in different industries, and provides those typically used sourcing requirements as options to the buyer according to the buyer's industry, so as to efficiently assist the buyer to configure his search requirements. In the example above, since the buyer is in the medicine manufacturing industry, the options provided by the business configuration panel are related to medicine manufacturing, e.g., FDA approved. Alternatively, if the buyer is in automobile industry, the options provided to the buyers will be related to automobile industry, e.g., TS16949 qualified.

For special and/or customized requirements, the buyer could set such requirement(s) as an essential or an optional requirement. If a requirement is set as an essential requirement, but a supplier does not satisfy that essential requirement, the supplier automatically will be rejected by the intelligent sourcing switch.

FIG. 2C illustrates an example embodiment where the class of normal requirements is divided into four exemplary subclasses: Yes/no subclass, Comparability subclass, Range subclass and Scores subclass. In the Yes/no subclass, the business configuration panel provides the buyer options to require the supplier to have, e.g., ISO certification, or after-sale service. In the Comparability subclass, the business configuration panel provides the buyer options concerning, for example, whether the buyer is interested in products/services with a similar name and/or of a similar product/service class. For example, if the product name has four words, and the buyer is interested in products with similar names, a product whose name matches three of the four words will also be presented to the buyer. In the subclass Range and subclass Scores, the buyer may input the factors the buyer is considering, including, for example, the price, the lead time, the quality, the payment term, and/or the INCO Term. The subclass Range allows for continuous characters, like price and lead time. The subclass Scores allows for discrete characters, like payment terms.

The classification, classes and subclasses of requirements presented herein are just some of the example embodiments. Different amounts of classes and/or subclasses of requirements could be presented via one or more GUIs.

In embodiments of the present invention, an intelligent sourcing switch builds up a collection of possible requirements concerning the suppliers, classifies the possible requirements, and provides the classified requirements via one or more GUIs to the buyer(s). In addition, or in the alternative, a buyer may also input any desired requirements into a GUI. Or, the intelligent sourcing switch may recognize the buyer's desired requirements for suppliers based on, for example, factors associated with the buyer. Such factors might include the buyer's business, search terms, etc. Or, the factors might include external considerations such as the time of year, etc. In further embodiments, information collected by the intelligent sourcing switch from the internal and external resources may be classified in substantially the same way in which the buyer's requirements are classified. In other words, for example, the business configuration panel provides a translation service between the buyer and the intelligent sourcing controller 100; the translation service translates the buyer's requirements into a language understandable by the intelligent sourcing controller.

In further embodiments, the buyer may follow the collection and classification provided by the business configuration panel, and/or revise the GUI and requirements in each GUI himself according to his business requirements.

The intelligent sourcing switch 101 could store the buyer's searching criteria. When a buyer opens a GUI to input his searching criteria, the default values on the GUI are the searching criteria the buyer used during the last search. The intelligent sourcing switch 101 also may use the saved searching criteria to search for suppliers repeatedly, regularly and automatically, and may save the search result into the supplier master data to provide information for later searches.

In further embodiments, to get information fits the buyer's needs more accurately, the business configuration panel could present a further GUI to allow the buyer to give a weighting level a to each requirement. FIG. 2D illustrates an exemplary GUI.

The weighting level a could be set by the buyer or the intelligent sourcing controller 100. For example,
if the requirement is very important, a=4;
if the importance of a requirement is high, a=3;
if the importance of a requirement is medium, a=2;
if the importance of a requirement is low, a=1; and
if a requirement is not important at all, a=0.

Thus, if price, for example, is an important factor, the buyer could set the weighting level for "price" to "4." And/or, if the lead time (or any other factor) is an important factor, the buyer could set the weighting level for "lead time" to "4." If the buyer is not very strict with the payment term or the INCO Term, the buyer may set the weighting level for either or both such requirements to "2" or "1."

In a further embodiment, the business configuration panel automatically saves the weighting level of various requirements set up by the buyer. Thus, in this embodiment, the default display on the weighting level GUI is the weighting levels set up by the buyer during the last search for suppliers. If the buyer changes any of the weighting levels, the new weighting levels will be shown as the default weighting levels during the next search for suppliers. In a further embodiment, the business configuration panel saves a weighting level setting for a certain number of previous searches, and allows the buyer to select one of the previously-used weighting level settings. Such a selection may be accomplished by clicking a button, checking a box, or keyboard inputting "Select Used Weighting" or other such term defined and/or recognized by the system on the GUI. In further embodiments, the buyer may add new requirements to this GUI and set up weighting levels for them by clicking a button, checking a box, or keyboard inputting "Weight More" or other such term defined and/or recognized by the system on the GUI.

In further embodiments, the business configuration panel 1011 provides a target for the search. A sourcing trigger 1012 receives the buyer's requirements for the suppliers from the business configuration panel, and starts the search for suppliers meeting the requirements by sending search requests to a number of external resources and internal resources.

The sourcing trigger 1012 sends a search request to a supplier master data 104, which stores criteria, results and ranking during previous searches. The supplier master data may include a potential supplier list, a price list, a material list, and/or a transaction history. The supplier master data also may be appraisals, evaluations, reports and scores about suppliers from a third party. The supplier master data may be complied by the buyer or the company of the buyer. Each time the intelligent sourcing switch finishes a search, the searching criteria, the appraisal and ranking of suppliers are sent to the supplier master data. In addition, the intelligent sourcing switch may be configured to save the requirements for suppliers, send the requests to external and internal sources regularly, and update the supplier master data according to the search result.

In further embodiments, the sourcing trigger 1012 sends a request to Business-to-Business (B2B) websites 105 to collect suppliers' information. Usually, B2B websites provides information about a supplier, the supplier's products, what certifications the supplier has, etc.

The sourcing trigger 1012 could send a request to Business-to-Consumer (B2C) websites, which provides information about a supplier's products, their prices, payment terms, delivery terms and return policy in a more consumer friendly way.

Some websites may provide product information about more than one suppliers, invite consumers to evaluate their shopping experiences at on-line stores, and provides rankings of products and suppliers. The sourcing trigger 1012 may be configured to send a request to such websites and collect the evaluation information and ranking information.

The sourcing trigger 1012 could send a search request to searching engine websites 106 to collect information relevant to the buyer's requirements. For example, if the buyer is looking for a medicine manufacturer which is ISO-9000 certified and has GAP certification, an Internet engine search may be used to provide a list of websites which have the words "ISO 9000" and "GAP certification."

The sourcing trigger 1012 collects and/or compares suppliers' Customer Relationship Management (CRM) information and/or performance from a supplier's website. The sourcing trigger 1012 further may obtain a potential supplier list from the supplier master data 104 and send a search request to a number of suppliers to get their real time responses.

In an embodiment, the sourcing trigger 1012 sends the requests via a website exchanger, which provides enterprise service repository, master data management and catalog contact management.

In response to the request, the external and internal resources return information to a data acceptor 1013. In an embodiment, the information is returned via a website exchanger.

A data analyzing unit 1014 then classifies information collected from the external and internal resources corresponding to the class and subclass of the requirements from the buyer, so that the collected information can be compared with the requirements from the buyer item by item. For the essential, optional and Yes/no requirements, the data analyzing unit 1014 finds out whether a supplier has the required certification or service. For the Range subclass and Scores subclass, the buyer may define a function curve for a certain type requirement according to his preference, and compare the buyer's target and the suppliers' response by their respective position in the function curve.

To avoid double counting of a same supplier, the data analyzing unit 1014 defines the suppliers by, for example, any combination of their names, telephone numbers, fax numbers, and/or addresses, and assigns a supplier ID to each supplier.

In further embodiments, if a requirement for suppliers is an essential requirement, but a supplier does not meet this requirement, this supplier will be rejected automatically. For example, one of the buyer's essential requirements is that the supplier must be FDA approved. Any supplier which is not FDA approved will be rejected automatically.

The intelligent sourcing switch compares the collected information with some of the requirements mathematically. In an embodiment, the data analyzing unit sets the rating score for the best response from the suppliers as 10, sets the rating score for the worst response from the suppliers as 0, evenly divides the space between the best and worst responses, and gives rating scores of 9 to 1 to other responses according to their positions in the space.

For example, for the Yes/no subclass, if a supplier meets the buyer's requirement, it gets a rating score 10. Otherwise, it gets a rating score 0. For example, for the Comparability subclass, the more similar a supplier's response is to the buyer's requirement, the higher the score.

Figure 3B:
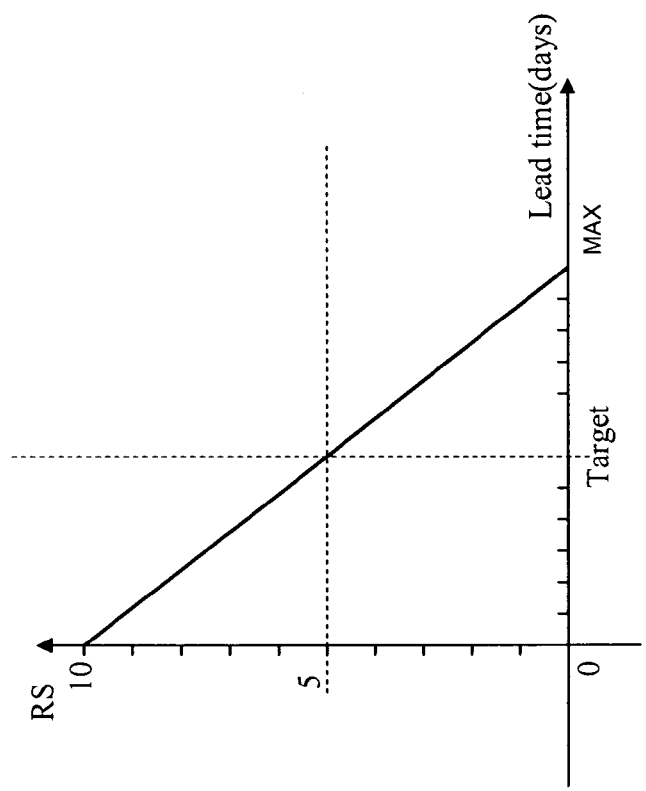
FIG. 3B illustrates an exemplary function curve representing suppliers' responses to a buyer's requirement for lead time according to an embodiment of the present invention.

For the Range subclass, a function curve is used for setting the rating score. In the embodiment shown in FIG. 3A, the buyer uses a cotangent function curve to define the relationship between the requirement "price" (x axis) and the rating score (y axis), giving the rating score 0 to the maximum price and the rating score 10 to the minimum price. The price from a supplier gets a rating score between 0 and 10 approximately according to its position in the function curve. In the embodiment shown in FIG. 3B, the buyer uses an inverse proportion function curve to define the relationship between the requirement "lead time" (x axis) and the rating score (y axis), giving the shortest lead time a rating score 10, and the longest lead time a rating score 0. Each lead time from the suppliers gets a rating score between 10 and 0 approximately according to their position in the function curve. In the embodiment shown in FIG. 3C, the buyer uses a parabola function curve to define the relationship between the requirement "quality" (x axis) and the rating score (y axis), giving both the best quality and the worst quality the rating score 0, and the target quality a rating score 10. Each response about the quality from the suppliers gets a rating score between 0 and 10 according to its position in the function curve.

Figure 3D:
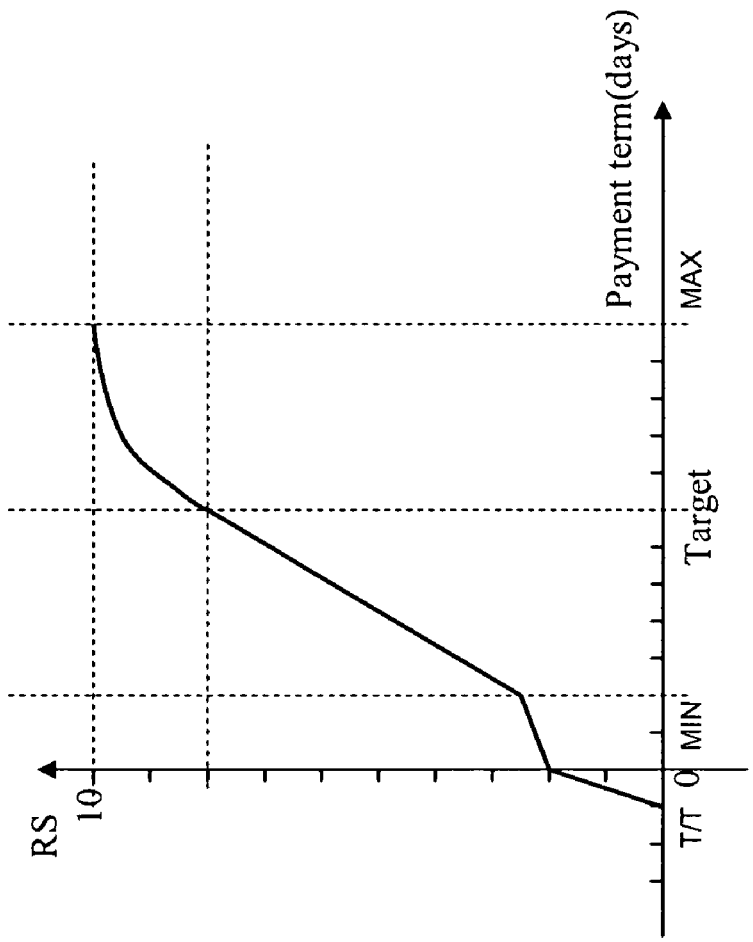
FIG. 3D illustrates an exemplary function curve representing suppliers' responses to a buyer's requirement for payment terms according to an embodiment of the present invention.

FIG. 3D illustrates payment terms, where the x axis is the days of the payment term. The buyer can define the function curve by giving rating scores to acceptable payment terms according to his preference, the longer the payment term, the higher the rating score. Each of the responses from suppliers gets a rating score according to its position in the function curve.

Figure 3E:
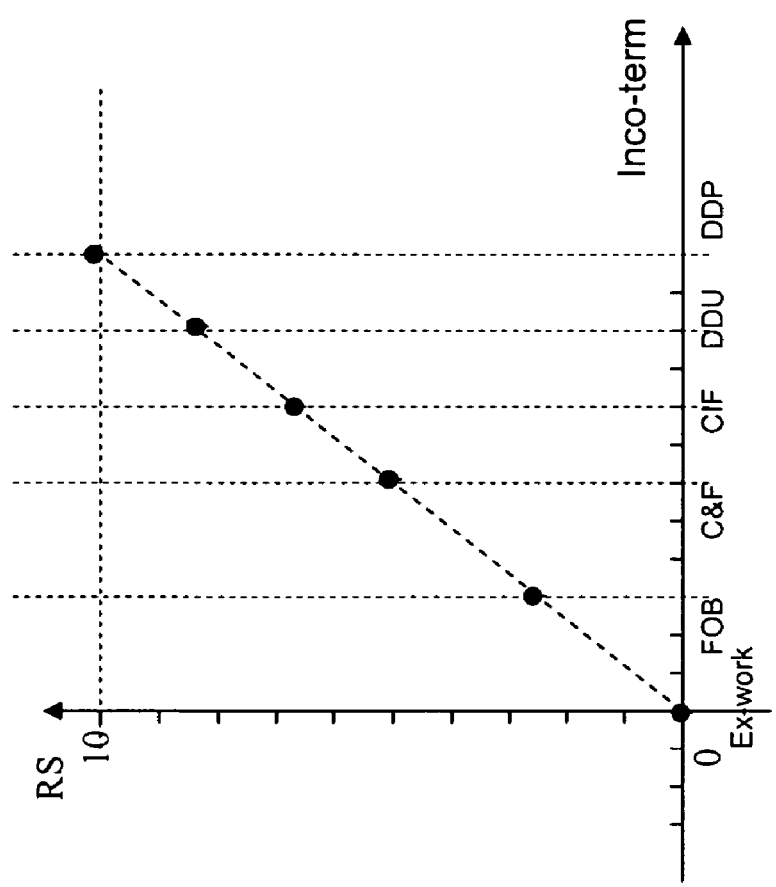
FIG. 3E illustrates an exemplary function curve representing suppliers' responses to a buyer's requirement for INCO Terms (internationally accepted commercial terms) according to an embodiment of the present invention.

Similarly, FIG. 3E is for INCO Terms, and the x axis is different INCO Terms. The buyer can define the function curve by giving rating scores to acceptable into-terms according to his preference. The more he likes an INCO Term, the higher the score for the INCO Term. Each of the supplier responses gets a rating score according to its position in the function curve.

After getting rating scores for response to each of the buyer requirements from the suppliers, the data analyzing unit calculates the ranking for each of the suppliers, for example, with the following formula:

$$R=\sqrt{(\Sigma(RS^*\alpha)^2)},$$

wherein R represents the ranking, RS represents the rating score, and a is the weighting level.

For example, the requirements of a buyer includes:
having an ISO certification, weighting level 3;
lowest price, weighing level 3;
short lead time, weighting level 4; and
long payment term, weighting level 2.

If a first supplier has an ISO certification, gets a rating score 6 for the price, a rating score 8 for the lead time, and a rating score 5 for the payment term, its ranking is:

$$\sqrt{(10^*3)^2+(6^*3)^2+(8^*4)^2+(5^*2)^2}=48.46$$

A second supplier does not have an ISO certification, gets a rating score 8 for the price, a rating score 7 for the lead time, and a rating score 9 for the payment term, its ranking is:

$$\sqrt{(0^*3)^2+(8^*3)^2+(7^*4)^2+(9^*2)^2}=41.04$$

Thus, in this example, the first supplier gets a higher ranking than the second supplier and is in a more favorable position in the list of suppliers recommended to the buyer.

Figure 4:
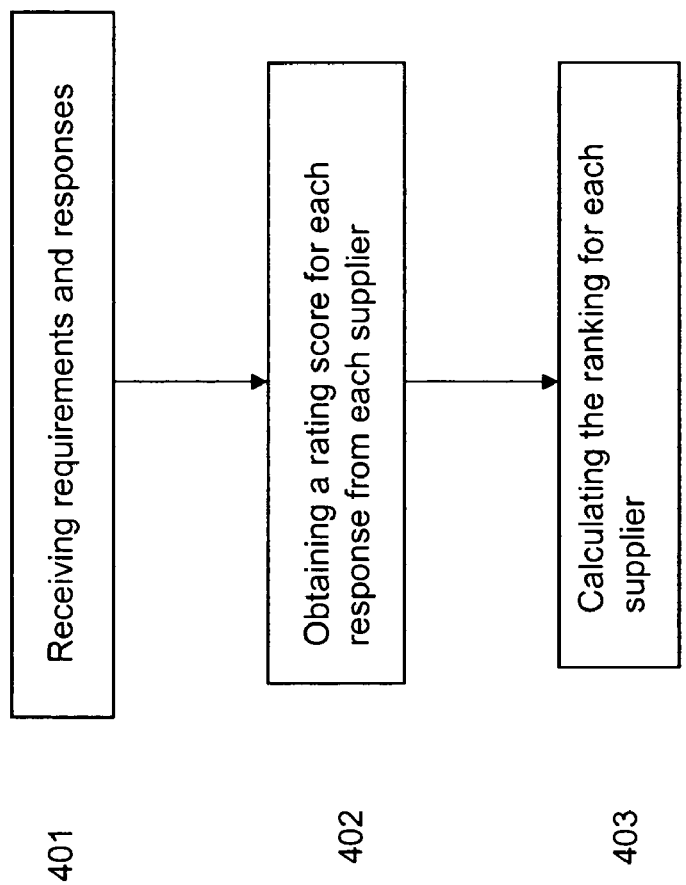
FIG. 4 illustrates a flow chart for calculating ranking of suppliers according to one embodiment of the present invention.

FIG. 4 illustrates a flow chart for calculating ranking of suppliers according to one embodiment of the present invention. At 401, the data analyzing unit 1014 receives the buyer's requirements (including the weighting level for each requirement) and the suppliers' responses to each of the requirements.

At 402, the data analyzing unit 1014 calculates the rating score for each response from each supplier. For the special requirements and customized requirements, if a requirement is essential but a supplier does not satisfy it, the supplier is rejected directly. For a requirement in the Yes/Not subclass, a supplier will get a rating score 10 if satisfying it, or a rating score 0 if not. For a requirement in the Comparability subclass, the more similar a supplier's response to the requirement, the higher the rating score. For a requirement in the Range and Score subclass, a response's rating score is corresponding to its position on the buyer defined function curve.

At 403, the data analyzing unit 1014 calculates a supplier's ranking with the rating score and weighting level of the supplier's response to each of the buyer's requirement.

In FIG. 1, the data analyzing unit provides the ranking of a list of favorable suppliers to a decision support module 1015 of the intelligent sourcing switch 101, which either shows the ranking of the suppliers to the buyer, or saves the ranking in a memory.

At an RFQ sender 102, the buyer picks a number of suppliers from the list of favorable suppliers from the intelligent sourcing switch 101, and sends RFQ to these suppliers. Alternatively, the RFQ sender may automatically send RFQ to top suppliers in the list from the intelligent sourcing switch.

A system synchronizer 103 then sends the ranking information and associated buyer requirements to the supplier master data to update data there.

While the invention has been described in detail above with reference to some embodiments, variations within the scope and spirit of the invention will be apparent to those of ordinary skill in the art. For example, although the embodiments are described with buyer and supplier, the present invention could be used to search any type of business partner.

What is claimed is:

1. A method for searching for a business partner, comprising:
classifying possible search requirements for a business partner into multiple classes;
providing the classified search requirements to a user;
providing a weighting level for each search requirement;
responsive to the user's input of the search requirements, sending search requests to an internal information resource storing previously stored data for business partners and an external information resource storing real time data for business partners;
receiving information about business partners as responses to the search requests;
assigning a rating score to a response from a business partner;
calculating ranking of a business partner with the weighting level and the rating score, wherein the weighting level of a search requirement is based on how important the search requirement is to the user, and the rating score is assigned according to how close the response matches a user's search requirement; and
classifying the responses according to the classified search requirements,
wherein the ranking is calculated with a formula:

$$R=\sqrt{(\Sigma(RS^*\alpha)^2)},$$

wherein R represents ranking of a business partner, RS represents rating score of a response from the business partner to a search requirement, and a represents weighting level of the search requirement.

2. The method of claim 1, further comprising:
saving the search requirements of the user; and
providing the saved search requirements as default search requirements for another search.

3. The method of claim 1, wherein the weighting level is received at a graphical user interface.

4. The method of claim 3, further comprising:
saving the received weighting level; and
providing the saved weighting level for another search.

5. The method of claim 1, wherein the response is assigned a highest rating score if it satisfies a first class of search requirement, but is assigned a lowest rating score if it fails to meet the first class of search requirement.

6. The method of claim 1, wherein responses from a plurality of business partners to a second class of search requirement constitute a continuous curve, and a rating score is assigned to a response according to the response's position in the continuous curve.

7. The method of claim 1, wherein responses from a plurality of business partners to a third class of search requirement are discrete points and a rating score is assigned to each of the discrete points.

8. The method of claim 1, further comprising providing a list of favorable business partners.

9. The method of claim 1, further comprising providing a graphical user interface to allow a user to customize the search requirements.

10. The method of claim 1, wherein the at least one internal resource is a master database.

11. The method of claim 10, wherein the master database stores at least one of a potential supplier list, a price list, appraisals of the business partners, and a third party's ranking of the business partners.

12. The method of claim 10, wherein the master database is updated after each search for a business partner.

13. The method of claim 12, wherein the search is sent automatically.

14. The method of claim 1, wherein the external resource is a business-to-business website.

15. The method of claim 1, wherein the external resource is a search engine website.

16. The method of claim 1, wherein the external resource provides real time response from business partners.

17. The method of claim 1, wherein the search requirements include essential search requirements, and a business partner is rejected if it fails to meet the essential search requirement.

* * * * *